United States Patent
Oh et al.

(10) Patent No.: US 11,199,926 B2
(45) Date of Patent: Dec. 14, 2021

(54) ELECTRONIC APPARATUS

(71) Applicant: LG Display Co., Ltd., Seoul (KR)

(72) Inventors: JunSeok Oh, Paju-si (KR); Sujin Kwon, Paju-si (KR); MinHo Sohn, Paju-si (KR); KiDuk Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 78 days.

(21) Appl. No.: 16/708,958

(22) Filed: Dec. 10, 2019

(65) Prior Publication Data

US 2020/0192545 A1    Jun. 18, 2020

(30) Foreign Application Priority Data

Dec. 12, 2018    (KR) .......................... 10-2018-0159844

(51) Int. Cl.
    *G06F 3/041*    (2006.01)
    *G06F 3/044*    (2006.01)

(52) U.S. Cl.
    CPC .......... *G06F 3/04182* (2019.05); *G06F 3/044* (2013.01); *G06F 3/0412* (2013.01)

(58) Field of Classification Search
    CPC ..... G06F 3/04182; G06F 3/0412; G06F 3/044
    See application file for complete search history.

(56) References Cited

U.S. PATENT DOCUMENTS

| | | | |
|---|---|---|---|
| 10,928,955 B1* | 2/2021 | Reed | G06F 3/044 |
| 2006/0262104 A1* | 11/2006 | Sullivan | G06F 3/0433 |
| | | | 345/177 |
| 2008/0309628 A1* | 12/2008 | Krah | G06F 3/04184 |
| | | | 345/173 |
| 2017/0280234 A1* | 9/2017 | Choi | H04R 1/025 |
| 2019/0320266 A1* | 10/2019 | Tanaka | H04R 7/10 |

* cited by examiner

*Primary Examiner* — Priyank J Shah
(74) *Attorney, Agent, or Firm* — Morgan, Lewis & Bockius LLP

(57) ABSTRACT

An electronic apparatus comprises a display module configured to display an image and including a touch electrode layer, a vibration generator including a vibration element on a rear surface of the display module, a touch driver configured to generate touch data by sensing a touch through the touch electrode layer, the touch data including noise information, an audio processor configured to supply an audio signal to the vibration element, and a controller configured to control a driving frequency of the audio signal based on the touch data.

13 Claims, 5 Drawing Sheets

ELECTRONIC APPARATUS

CROSS-REFERENCE TO RELATED APPLICATIONS

This application claims the benefit of the Korean Patent Application No. 10-2018-0159844 filed on Dec. 12, 2018, which is hereby incorporated by reference as if fully set forth herein.

BACKGROUND

Field of the Disclosure

The present disclosure relates to an electronic apparatus, and more particularly, to an electronic apparatus capable of generating sound.

Discussion of the Related Art

Generally, electronic apparatuses, such as a television, a monitor, a notebook computer, a smartphone, a tablet computer, an electronic pad, a wearable device, a watch phone, a portable information device, a navigation device, or a vehicle control display apparatus include a display apparatus to display an image, and a sound apparatus to output sound related to the image. The electronic apparatus may also include a touch screen capable of recognizing a user's touch.

Generally, the electronic apparatus outputs a video signal to display an image on a screen of the display panel, and outputs an audio signal through a speaker to reproduce an audio signal. The speaker may be implemented as an external speaker system installed outside a display apparatus or an internal speaker disposed inside the display apparatus.

However, in the electronic apparatus of the related art, because sound generated by the sound apparatus is output in a direction toward a rear surface or a side surface of a main body (or housing), rather than to a front surface of a display panel, sound may not travel toward a viewer (or a user) who watches an image in front of the display panel. Thus, immersion of the viewer who watches the image may be disturbed.

Further, in the electronic apparatus of the related art, when an audio processing unit for driving a speaker and a touch driver for driving a touch panel are simultaneously driven, noise may be generated in touch data for sensing a user touch due to a signal having a high voltage provided from the audio processing unit. Such noise of the touch data may deteriorate the performance of the touch panel and make it difficult for the driving circuits to be compatible with each other.

SUMMARY

Accordingly, the present disclosure is directed to providing an electronic apparatus that substantially obviates one or more problems due to limitations and disadvantages of the related art.

An aspect of the present disclosure is to provide an electronic apparatus in which a driving frequency of an audio signal provided to a vibration generating unit is changed on the basis of noise information included in touch data, thereby reducing noise of the touch data and enhancing performance of a touch panel.

Another aspect of the present disclosure is to provide an electronic apparatus in which an audio processing unit providing an audio signal to a vibration generating unit is mounted together with a display driving circuit and a touch driver, thereby enhancing compatibility between driving circuits.

To achieve these and other advantages and in accordance with the purpose of the disclosure, as embodied and broadly described herein, an electronic apparatus includes a display module configured to display an image and including a touch electrode layer; a vibration generator including a vibration element on a rear surface of the display module; a touch driver configured to generate touch data by sensing a touch through the touch electrode layer, wherein the touch data includes noise information; an audio processor configured to supply an audio signal to the vibration element; and a controller configured to control a driving frequency of the audio signal based on the touch data.

In another aspect of the present disclosure, an electronic apparatus includes a display module configured to display an image and including a touch electrode layer; a vibration generator including a vibration element on a rear surface of the display module; a touch driver configured to generate touch data by sensing a touch through the touch electrode layer, wherein the touch data includes noise information; and a driving circuit on a rear surface of the display module, the driving circuit configured to generate image data and a timing synchronization signal for driving the display module, and to control the vibration generator based on the touch data, wherein the driving circuit includes a controller configured to control a driving frequency of an audio signal provided to the vibration generator based on the touch data.

It is to be understood that both the foregoing general description and the following detailed description of the present disclosure are exemplary and explanatory and are intended to provide further explanation of the disclosure as claimed.

BRIEF DESCRIPTION

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
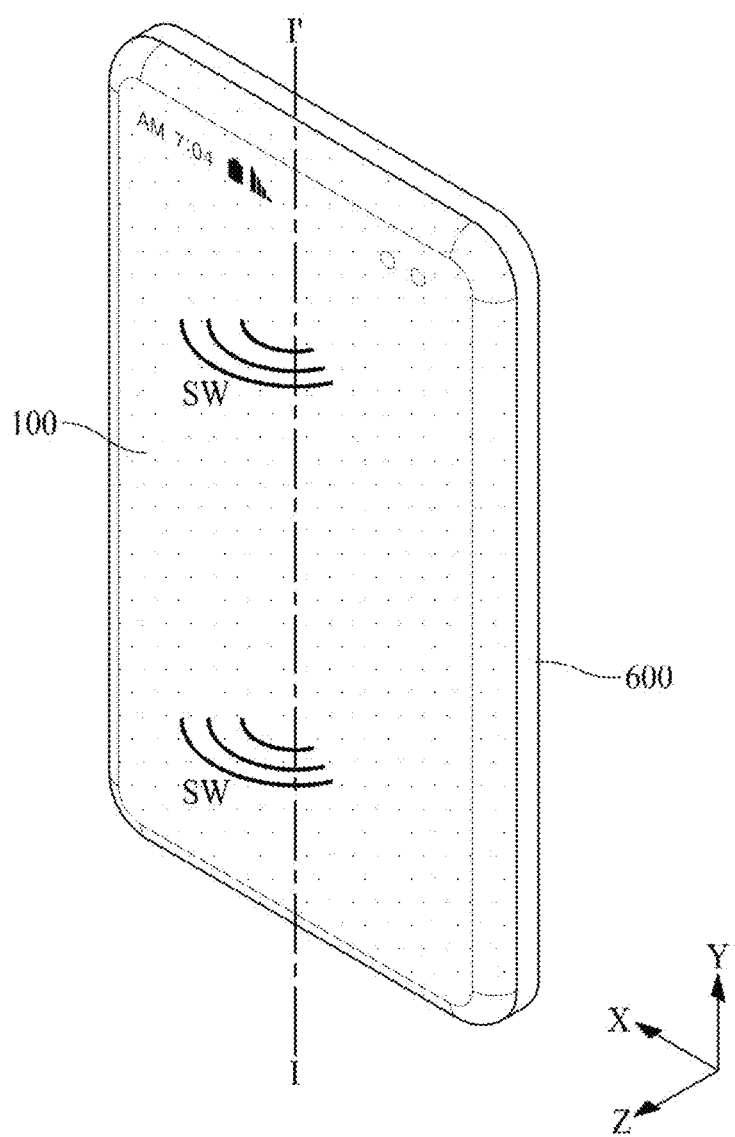
FIG. 1 is a perspective view showing an electronic apparatus according to an example embodiment of the present disclosure.

Reference will now be made in detail to embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as "on~," "over~," "under~," and "next~," one or more other parts may be disposed between the two parts unless 'just' or 'direct' is used.

In describing a time relationship, for example, when the temporal order is described as "after~," "subsequent~," "next~," and "before~," a case which is not continuous may be included unless 'just' or 'direct' is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as first, second, A, B, (a), (b), etc., may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it can be directly on or directly connected to the other element or layer, or intervening elements or layers may be present. Also, it should be understood that when one element is disposed on or under another element, this may denote a case where the elements are disposed to directly contact each other, but may denote that the elements are disposed without directly contacting each other.

The term "at least one" should be understood as including any and all combinations of one or more of the associated listed elements. For example, the meaning of "at least one of a first element, a second element, and a third element" denotes the combination of all elements proposed from two or more of the first element, the second element, and the third element as well as the first element, the second element, or the third element.

In the present disclosure, examples of a display apparatus may include a narrow-sense display apparatus, such as an organic light emitting display (OLED) module or a liquid crystal module (LCM) including a display panel and a driver for driving the display panel. Also, examples of the display apparatus may include a set device (or a set apparatus) or a set electronic device such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module. However, embodiments are not limited thereto.

Therefore, in the present disclosure, examples of the display apparatus may include a narrow-sense display apparatus itself, such as an LCM or an OLED module, and a set device, which is a final consumer device or an application product including the LCM or the OLED module.

In some embodiments, an LCM or an OLED module including a display panel and a driver may be referred to as a narrow-sense display apparatus, and an electronic device, which is a final product including an LCM or an OLED module, may be referred to as a set device. For example, the narrow-sense display apparatus may include a display panel, such as an LCD or an OLED, and a source printed circuit board (PCB), which is a controller for driving the display panel. The set device may further include a set PCB, which is a set controller electrically connected to the source PCB to overall control the set device.

A display panel applied to example embodiments may use all types of display panels, such as a liquid crystal display panel, an organic light emitting diode (OLED) display panel, and an electroluminescent display panel, but is not limited to a specific display panel. According to example embodiments, the display panel is vibrated by a sound generation device to output a sound. Also, a shape or a size of a display panel applied to a display apparatus according to example embodiments is not limited.

In an example where the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT), which is a switching element for adjusting a light transmittance of each of the plurality of pixels, an upper substrate including a color filter and/or a black matrix, and a liquid crystal layer between the array substrate and the upper substrate.

In an example where the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT, which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, an example of the present disclosure will be described with reference to the accompanying drawings and examples.

Figure 2:
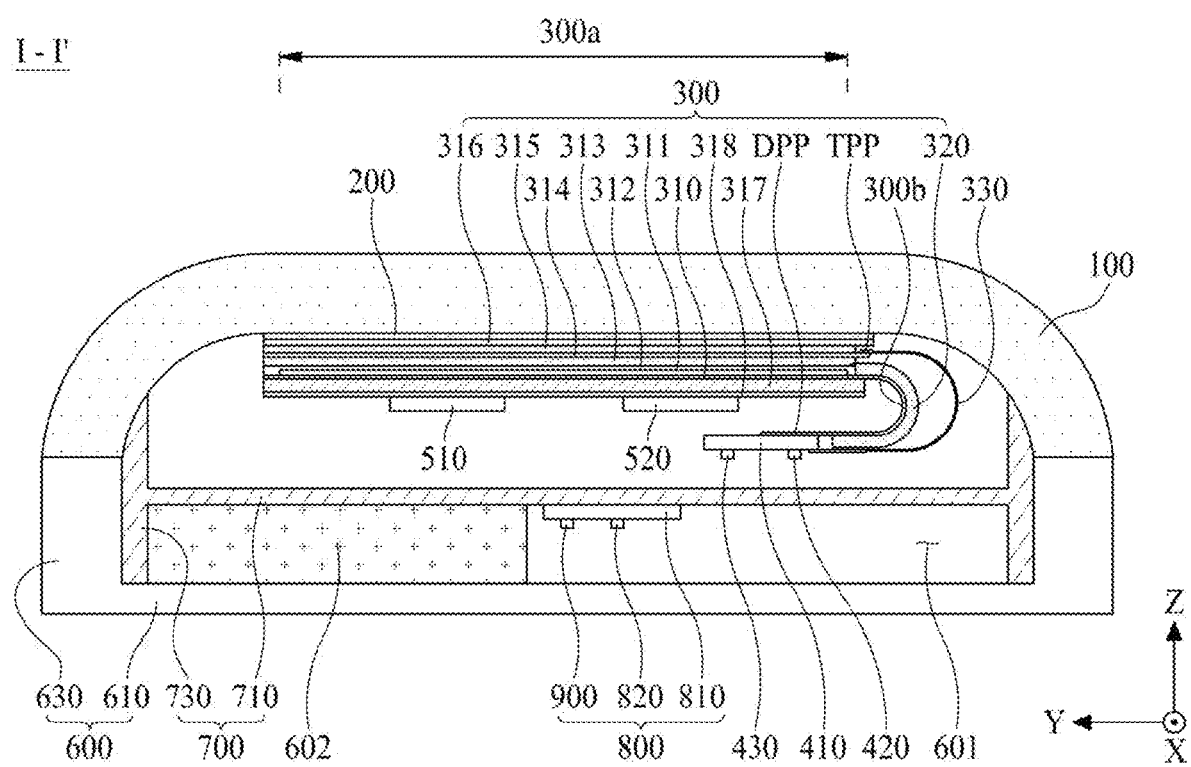
FIG. 2 is an example of a cross-sectional view taken along line I-I' shown in FIG. 1.
Figure 3:
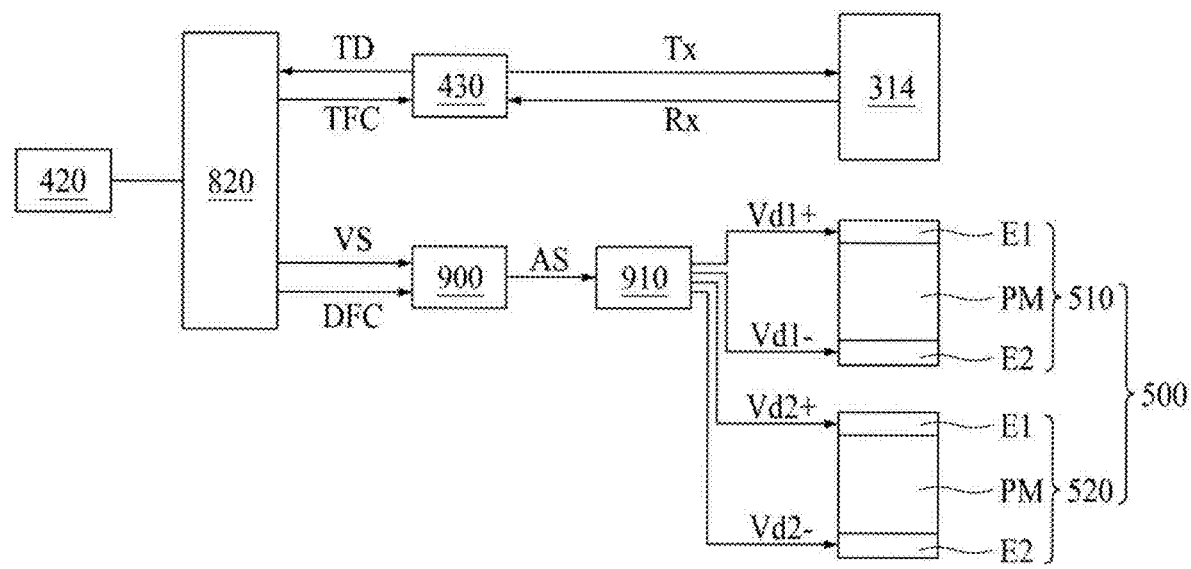
FIG. 3 is a circuit block diagram showing an operation of a controller shown in FIG. 2.
Figure 4:
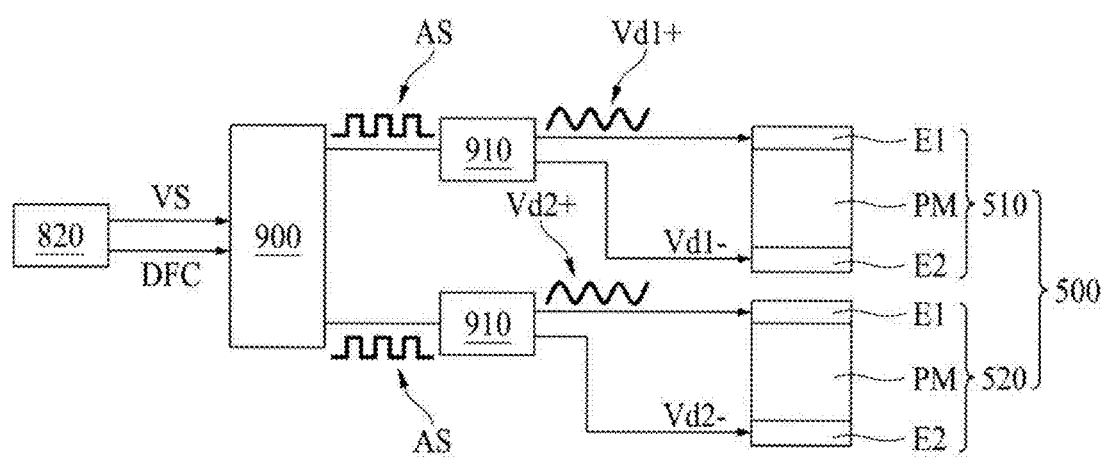
FIG. 4 is a diagram illustrating a process of controlling a driving frequency of an audio signal by the controller shown in FIG. 2.

FIG. 1 is a perspective view showing an electronic apparatus according to an example embodiment of the present disclosure, and FIG. 2 shows an example of a cross-sectional view taken along line I-I' shown in FIG. 1. FIG. 3 is a circuit block diagram showing an operation of a controller shown in FIG. 2, and FIG. 4 is a diagram illustrating a process of controlling a driving frequency of an audio signal by the controller shown in FIG. 2.

With reference to FIGS. 1 to 4, an electronic apparatus may include a cover window 100, a display module 300, a circuit board 410, a vibration generating unit 500, a housing 600, a middle frame 700, and a driving circuit unit 800.

The cover window 100 covers a front surface and a side surface of the display module 300 to protect the display module 300 from an external impact.

According to an example, the cover window 100 may be formed of a transparent plastic material, a glass material, or a tempered glass material. For example, the cover window 100 may include sapphire glass. In another example, the cover window 100 may include at least one of materials such as polyethyleneterephthalate (PET), polycarbonate (PC), polyethersulfone (PES), polyethylenepthanate (PEN), and polynorbornene (PNB). Further, the cover window 100 may be formed of tempered glass in consideration of scratches and transparency.

According to an example, the cover window 100 may have a generally curved four-sided bending structure overall, thereby improving aesthetics of the electronic apparatus and reducing a width of a bezel in a widthwise direction and a lengthwise direction of the electronic apparatus.

The display module 300 may correspond to a display module of a flat panel display apparatus or a display module of a flexible display apparatus. Hereinafter, it is explained that the display module 300 may be a display module of a flexible display apparatus. However, the present disclosure is not limited thereto.

The display module 300 may be coupled to a rear surface (or back surface) of the cover window 100 to display an image or sense a user's touch. For example, the display module 300 may be bonded to the rear surface of the cover window 100 through a direct bonding process using a module bonding member 200. Here, the module bonding member 200 may be an optically clear adhesive (OCA), optically clear resin (OCR), or pressure sensitive adhesive (PSA).

According to an example, the display module 300 may include a display unit 300a and a bending area 300b. The display unit 300a overlaps a pixel array layer 311 to display an image on a front side of the cover window 100. The bending area 300b may extend from the display unit 300a and may be bent in a curved shape. For example, the bending area 300b may be bent to enclose one side of a back plate 317 and a heat dissipating member 318, and a display pad part DPP may overlap one edge of a rear surface of a back plate 317. In this manner, the display module 300 may have a thin bezel width as the bending area 300b of the flexible substrate 310 has a certain radius of curvature.

The display module 300 may include a flexible substrate 310, a pixel array layer 311, the encapsulation layer 312, a touch electrode layer 314, a functional film 316, a back plate 317, a heat dissipating member 318, a display pad part (DPP), a touch pad part (TPP), a micro-cover layer 320, and a touch flexible circuit film 330.

The flexible substrate 310 may be defined as a base substrate of the display module 300. According to an example, the flexible substrate 310 may include a plastic material having flexibility, for example, at least one of materials among polyimide (PI), polyethyleneterephthalate (PET), polycarbonate (PC), polyethersulfone (PES), polyethylenaphthanate (PEN), polynorbornene (PNB), polymethylpentene (PMP), poly methyl methacrylate (PMMA), and cycloolefin copolymer (COC), and more preferably, includes an opaque or colored PI. According to another example, the flexible substrate 310 may be formed of a thin glass material having flexibility.

The pixel array layer 311 may display an image on the display unit 300a. The pixel array layer 311 may be provided in a pixel region defined by signal lines provided on the flexible substrate 310 and may include a plurality of pixels displaying an image according to a signal supplied to the signal lines. According to an example, each of the plurality of pixels includes a pixel circuit layer including a driving thin film transistor (TFT) provided in the pixel region, an anode electrode electrically connected to the driving TFT, a light emitting device layer formed on the anode electrode, and a cathode electrode electrically connected to the light emitting device layer.

The encapsulation layer 312 may be formed on the flexible substrate 311 to surround the pixel array layer 311, thus preventing oxygen or moisture from penetrating into the light emitting device layer of the pixel array layer 311. According to an example, the encapsulation layer 312 may have a multilayer structure in which an organic material layer and an inorganic material layer are alternately stacked.

The touch electrode layer 314 may be disposed on the encapsulation layer 312 to serve as a touch sensor for sensing a user's touch applied to the cover window 100. According to an example, the touch electrode layer 314 may include a plurality of touch driving electrodes disposed at a certain interval on the encapsulation layer 312 and a plurality of touch sensing electrodes electrically insulated from the plurality of touch driving electrodes. For example, the plurality of touch sensing electrodes may be disposed on the same layer as the plurality of touch driving electrodes or may be disposed on different layers with a dielectric layer interposed there-between.

The functional film 316 may be attached on the touch electrode layer 314 via a film adhesive member 315 and may be attached to the cover window 100 via the module bonding member 200. In an example, the film adhesive member 315 may be an optically clear adhesive (OCA), an optically clear resin (OCR), or a pressure sensitive adhesive (PSA).

According to an example, the functional film 316 may include an antireflection layer (or an antireflection film) for preventing reflection of external light and improving outdoor visibility and contrast ratio of an image displayed on the display module 300 of the electronic apparatus. For example, the antireflection layer may include a circular polarization layer (or a circular polarization film) for blocking reflected light which passes through the cover window 100 after external light incident through the cover window 100 is reflected by thin film transistors (TFT) and/or lines disposed on the pixel array layer 311.

The back plate 317 may be attached to the rear surface (or back surface) of the flexible substrate 310 overlapping the pixel array layer 311 to maintain the rear surface of the flexible substrate 310 overlapping the pixel array layer 311 in a planar state.

The heat dissipating member 318 may be attached to the rear surface (or back surface) of the back plate 317 to dissipate heat generated in the pixel array layer 311. According to an example, the heat dissipating member 318 may include a material having a relatively high thermal conductivity. Such a heat dissipating member may perform a heat dissipating function, a ground function, and a function of protecting the rear surface of the display module 300.

The display pad part DPP may include a plurality of pad electrodes provided on one edge of the flexible substrate 310 spaced apart from one side of the pixel array layer 311. Each of the plurality of pad electrodes may be electrically connected to a signal line of the pixel array layer 311 through a link line.

The touch pad part TPP may include a plurality of touch pad electrodes disposed at one side edge of the touch electrode layer 314 corresponding to one side edge of the flexible substrate 310 and electrically connected to the touch electrode layer 314. According to an example, the plurality of touch pad electrodes may be connected to the touch sensing electrodes and the touch driving electrodes through a plurality of respective touch routing lines. The touch pad part TPP may overlap a link line disposed on the flexible substrate 310.

The micro-cover layer 320 may cover the bending area 300b of the flexible substrate 310. For example, the micro-cover layer 320 may include a polymeric material and may be coated on the bending area 300b of the flexible substrate 310 to cover the link line between the encapsulation layer 312 and the circuit board 410. The micro-cover layer 320 may protect the link line from external impact, while preventing water vaper transmission to the link line. According to an example, the micro-cover layer 320 may position the link lines in a neutral plane when the bending area 300b of the flexible substrate 310 is bent into a curved shape with a certain radius of curvature. That is, when the bending area 300b of the flexible substrate 310 is bent at a certain radius of curvature, there may be a neutral plane in which a tensile force and a compressive force are zero between the flexible substrate 310 and the micro-cover layer 320. Accordingly, the link lines are disposed on the neutral plane between the micro-cover layer 320 and the flexible substrate 310, thereby preventing the bending area 300b of the flexible substrate 300 from being damaged by bending stress when the bending area 300b is bent in a curved shape.

The touch flexible circuit film 330 may be disposed between the touch pad part TPP and the circuit board 410 by a film attaching process. For example, one side of the touch flexible circuit film 330 may be electrically connected to the touch pad part TPP provided in the display module 300, and the other side of the touch flexible circuit film 330 may be electrically connected to the circuit board 410. The touch flexible circuit film 330 may provide a touch driving signal Tx supplied from a touch driver 430 mounted on the circuit board 410 to the touch electrode layer 314 through the touch pad part TPP, and provide a signal corresponding to a change in capacitance of the touch electrode layer 314 to the touch driver 430 through the touch pad part TPP.

The circuit board 410 may be connected to the display module 300 to allow the display driving circuit 420 and the touch driver 430 to be mounted thereon. For example, the circuit board 410 may be electrically connected to a display pad part DPP provided on the flexible substrate 310 by a film attaching process and disposed to overlap the back plate 317 by bending the flexible substrate 310. According to an example, the circuit board 410 may provide image data and a timing synchronization signal supplied from the driving circuit unit 800 to the display driving circuit 420 and may provide a voltage required for driving each of the pixel array layer 311, the display driving circuit 420, and the touch driver 430.

The display driving circuit 420 may be mounted on the circuit board 410 connected to the display module 300 through a chip bonding process or a surface mounting process. For example, the display driving circuit 420 may be electrically connected to the display pad part DPP and electrically connected to the pixel array layer 311 through the link line. According to an example, the display driving circuit 420 may receive image data and the timing synchronization signal from the driving circuit 800 and generate a data signal and a scan signal. The display driving circuit 420 may provide the data signal and the scan signal to the pixel array layer 311 to display an image on a plurality of pixels arranged in the pixel array layer 311.

The touch driver 430 may be mounted on the circuit board 410 and may be electrically connected to the touch electrode layer 314 through the touch flexible circuit film 330. The touch driver 430 may generate touch data TD including noise information by sensing a user's touch through the touch electrode layer 314. That is, the touch driver 430 may sense a user's touch applied to the cover window 100 through the touch electrode layer 314. For example, the touch driver 430 may provide a touch driving signal Tx to the touch electrode layer 314 and sense a change in capacitance of the touch electrode layer 314 to receive an analog touch sensing signal Rx. The touch driver 430 may perform analog-to-digital conversion on the touch sensing signal Rx to generate touch raw data and detect noise information included in the touch raw data. According to an example, the touch driver 430 may sense a user's touch in an audio mode to generate touch raw data and compare the touch raw data with a predetermined reference pattern to detect noise information. The touch driver 430 may generate touch data TD including touch coordinate information and noise information and provide the touch data TD to the controller 820.

The vibration generating unit 500 may be attached to the rear surface of the display module 300. For example, the vibration generating unit 500 may vibrate the display module 300 according to an audio signal AS supplied from the driving circuit unit 800, thereby outputting sound SW to the front side direction Z of the display module 300 according to vibration of the display module 300. In an example, the vibration generating unit 500 may vibrate the display module 300 by an inverse piezoelectric effect in accordance with the audio signal AS.

According to an example, the vibration generating unit 500 may include first and second vibration elements 510 and 520 coupled to the rear surface of the display module 300. When the vibration generating unit 500 is applied to a mobile electronic apparatus, the vibration generating unit 500 may be used as a speaker, a receiver, a microphone, and the like, but is not limited thereto. For example, when the vibration generating unit 500 is applied to a mobile electronic apparatus, the first vibration element 510 may act as a receiver used for call communication, and the second vibration element 520 may act as a speaker for the existing mobile device. In another example, both the first and second vibration elements 510 and 520 may serve as speakers and may thereby be used as surround speakers that utilize two speakers.

The first vibration element 510 may vibrate a first region of the display module 300 according to the audio signal AS provided from the driving circuit unit 800. According to an example, the first vibration element 510 may be coupled to the first region defined on the rear surface of the display module 300 via an adhesive member. Here, the first region may be defined as a region adjacent to one side of the display module 300 with respect to a second lengthwise direction (or the longer side direction) Y of the display module 300. When the audio signal AS is applied from the driving circuit unit 800, the first vibration element 510 may repeat compression and contraction according to the inverse piezoelectric effect in accordance with the audio signal AS to vibrate the first region of the display module 300.

The second vibration element 520 may vibrate a second region of the display module 300 according to the audio signal AS provided from the driving circuit unit 800. According to an example, the second vibration element 520 may be coupled to the second region defined on the rear surface of the display module 300 via an adhesive member. Here, the second region may be defined as a region adjacent to the other side of the display module 300 with respect to a second lengthwise direction Y of the display module 300. The second region may be disposed to be symmetrical to the first region with respect to the center of the display module 300. The second vibration element 520 may be disposed to be symmetrical to the first vibration element 510 with respect to the center of the display module 300. When the audio signal AS is applied from the driving circuit unit 800, the second vibration element 520 may repeat compression and contraction due to the inverse piezoelectric effect in accordance with the audio signal AS to vibrate the second region.

The housing 600 may receive the display module 300 and support the cover window 100. According to an example, the housing 600 may include a rear cover 610 covering the rear side of the display module 300 with a circuit receiving space 601 interposed therebetween and a side cover 630 supporting the cover window 100.

The rear cover 610 may be disposed on the outermost rear surface of the electronic apparatus and include a plastic material, a metal material, or a glass material. For example, the rear cover 610 may include a glass material having a color coating layer.

The side cover 630, which is disposed on the outermost side of the electronic apparatus, may be bent from the edge of the rear cover 610 and combined with the cover window 100.

The circuit receiving space 601 may be provided between the display module 300 and the rear cover 610. For example, the circuit receiving space 601 may be disposed between the circuit board 410 and the rear cover 610, and receive a battery 602, a middle frame 700, and a driving circuit unit 800.

The middle frame 700 may be disposed in the circuit receiving space 601 of the housing 600 to support the battery 602 and the driving circuit unit 800. In addition, the middle frame 700 may support the cover window 100. According to an example, the middle frame 700 may include a middle plate 710 parallel to and spaced apart from the rear cover 610, and a middle sidewall 730 extending vertically from the edge of the middle plate 710.

The middle plate 710 may be disposed between the rear surface of the display module 300 and the rear cover 610 to support the battery 602 and the driving circuit unit 800. A front surface of the middle plate 710 and a rear surface of the circuit board 410 may be spaced apart from each other to face each other, and the rear surface of the middle plate 710 may support the driving circuit 800. Therefore, the circuit board 410 and the driving circuit unit 800 may be spaced apart from each other with the middle plate 710 interposed therebetween.

The middle sidewall 730 may be vertically coupled to an edge side of the middle plate 710 and support the edge of the cover window 100.

The driving circuit unit 800 may be disposed on the rear surface of the display module 300, generate image data and a timing synchronization signal for driving the display module 300, and control the vibration generating unit 500 on the basis of the touch data TD. According to an example, the driving circuit unit 800 may include a main board 810, a controller 820, and an audio processing unit 900.

The main board 810 may be disposed in the circuit receiving space 601 to support the controller 820 and the audio processing unit 900. For example, the main board 810 may be disposed on one surface of the middle plate 710 facing the rear cover 610 and supported by the middle plate 710. The main board 810 may be electrically connected to the circuit board 410 and the vibration generating unit 500 and allow the controller 820 and the audio processing unit 900 to be mounted thereon. For example, the main board 810 may provide the image data and the timing synchronization signal supplied from the controller 820 to the display driving circuit 420 mounted on the circuit board 410, and may provide a voltage required for driving each of the controller 820, the audio processing unit 900, and the vibration generating unit 500.

The controller 820, which controls an overall operation of the electronic apparatus, may be represented as a host controller, a microprocessor, an application processor, or the like. In an example, the controller 820 may display an image by providing the image data and the timing synchronization signal to the display driving circuit 420. Furthermore, the controller 820 may calculate a touch position on the basis of the touch data TD provided from the touch driver 430 and execute an application corresponding to the calculated touch position.

The controller 820 may select an audio mode or a default mode according to whether the vibration generating unit 500 is driven. For example, when the audio processing unit 900 supplies the audio signal AS to at least one vibration element 510 and the at least one vibration element 510 is driven, the controller 820 selects the audio mode, and when the audio processing unit 900 does not supply the audio signal AS to the at least one vibration element 510 so the at least one vibration element 510 is not driven, the controller 820 may select a default mode. Here, the electronic apparatus may perform all functions except sound output in the default mode. Also, a mode signal of the audio mode may have a high logic level, and a mode signal of the default mode may have a low logic level.

The controller 820 may control an amplitude and a frequency of the audio signal AS output from the audio processing unit 900. For example, the controller 820 may generate a vibration signal VS on the basis of an audio source during the audio mode and provide the vibration signal VS to the audio processing unit 900. The audio processing unit 900 may output an audio signal AS on the basis of the vibration signal VS and provide the audio signal AS to the vibration generating unit 500. In this manner, because the vibration generating unit 500 vibrates the display module 300 according to the audio signal AS supplied from the audio processing unit 900, a sound SW may be output to the front side direction Z of the display module 300 according to vibration of the display module 300.

The controller 820 may provide a driving frequency control signal DFC to the audio processing unit 900 to control a driving frequency of the audio signal AS output from the audio processing unit 900. According to an example, the controller 820 may control the driving frequency of the audio signal AS on the basis of the touch data TD provided from the touch driver 430. For example, the controller 820 may receive the touch data TD including noise information in the audio mode and compare the noise information with a plurality of predetermined frequency modes. Here, each of the plurality of frequency modes may correspond to specific noise information in a one-to-one manner, and when the audio processing unit 900 is driven in a frequency mode corresponding in a one-to-one manner to the specific noise information, the driving frequency of the audio signal AS may have an optimal frequency that may reduce specific noise included in touch raw data.

The controller 820 may further provide a touch frequency control signal TFC to the touch driver 430 to further control the touch frequency of the touch driving signal Tx. According to an example, the controller 820 may control the driving frequency of the audio signal AS and the touch frequency of the touch driving signal Tx on the basis of the touch data TD provided from the touch driver 430. For example, the controller 820 may receive the touch data TD including the noise information in the audio mode and compare the noise information with a plurality of predetermined frequency modes. Here, each of the plurality of frequency modes may correspond in a one-to-one manner to specific noise information, and if there is no frequency mode corresponding in a one-to-one manner to the specific noise information, the controller 820 may select the driving frequency and touch frequency mode. Therefore, in the driving frequency and touch frequency mode, each of the driving frequency of the audio signal AS and the touch frequency of the touch driving signal Tx may have an optimal frequency that may reduce specific noise included in the touch raw data.

For example, the touch driver 430 may provide the touch driving signal Tx having a specific frequency to the touch electrode layer 314 in the audio mode and receive the touch sensing signal Rx in accordance with a change in capacitance, and the audio processing unit 900 may provide the audio signal AS to the at least one vibration element 510 in the audio mode to output sound. When the touch driver 430 and the audio processing unit 900 are simultaneously driven in the audio mode, the audio signal AS has a high potential for outputting sound, and thus, noise may occur in the touch sensing signal Rx received by the touch driver 430. Accordingly, the controller 820 may determine an optimal frequency for reducing or eliminating noise on the basis of the noise information of the touch data TD received from the touch driver 430, and change the driving frequency of the audio signal AS into a determined frequency. Therefore, when the touch driver 430 and the audio processing unit 900 are driven simultaneously in the audio mode, the electronic apparatus according to an example embodiment of the present disclosure may change the driving frequency of the audio signal AS on the basis of the noise information, thereby preventing occurrence of noise in the touch data TD caused by the audio signal AS.

According to an example, if there is a frequency mode corresponding in a one-to-one manner to noise information according to a result of comparing the noise information with the plurality of predetermined frequency modes, the controller 820 may select a driving frequency mode, and when there is no frequency mode corresponding in a one-to-one manner to the noise information, the controller may select the driving frequency and touch frequency mode. For example, the frequency mode corresponding in a one-to-one manner to the noise information corresponds to an optimal frequency mode capable of eliminating noise of the touch data TD caused by the audio signal AS. That is, when there is a frequency mode corresponding in a one-to-one manner to the noise information among the plurality of predetermined frequency modes, the controller 820 may select the driving frequency mode, and the controller 820 may select the driving frequency mode and provide a driving frequency control signal DFC to the audio processing unit 900 according to a selected frequency mode among the plurality of frequency modes. In this manner, the controller 820 may remove noise of the touch data TD caused by the audio signal AS by changing the driving frequency of the audio signal AS.

The controller 820 may select the driving frequency and touch frequency mode when the frequency mode corresponding in a one-to-one manner to the noise information does not exist. Here, because it may not sufficiently remove noise of the touch data TD by changing only the driving frequency of the audio signal AS, the controller 820 may additionally change the touch frequency of the touch drive signal Tx. That is, the controller 820 provides the driving frequency control signal DFC to the audio processing unit 900 to change the driving frequency of the audio signal AS and provides the touch frequency control signal TFC to the touch driver 430 to change the touch frequency of the touch driving signal Tx. Accordingly, even if the frequency mode corresponding in a one-to-one manner to the noise information does not exist, the controller 820 may determine the driving frequency of the audio signal AS and the touch frequency of the touch driving signal Tx capable of removing noise of the touch data TD caused by the audio signal AS having a high potential.

As a result, in the electronic apparatus according to an example embodiment of the present disclosure, by changing only the driving frequency of the audio signal AS or changing both the driving frequency of the audio signal AS and the touch frequency of the touch driving signal Tx according to the result of comparison between noise information and the plurality of predetermined frequency modes, noise of the touch data TD caused by the audio signal AS having a high potential may be reduced or eliminated, thereby improving touch sensitivity and performance of the touch panel.

In FIG. 4, the audio processing unit 900 may output sound by providing the audio signal AS to at least one vibration element 510 in the audio mode. For example, the audio processing unit 900 amplifies the vibration signal VS provided from the controller 820 during the audio mode to generate the audio signal AS in the form of a pulse width modulation (PWM) signal and converts the audio signal AS into a vibration driving voltage in the form of a sine wave. In an example, a load unit 910 may receive the audio signal AS in the form of a PWM signal output from the audio processing unit 900 and convert the audio signal into a vibration driving voltage in the form of a sine wave. According to an example, the load unit 910 may include an inductor, and the audio signal AS in the form of a PWM signal may be converted into the vibration driving voltage in the form of a sine wave by a load value applied to the load unit 910. For example, the load value applied to the load unit 910 may be determined by capacitance formed between first and second electrodes E1 and E2 of the first and second vibration elements 510 and 520 of the load unit 910.

Accordingly, the audio processing unit 900 may provide the vibration driving voltage in the form of a sine wave to at least one of the first and second vibration elements 510 and 520. For example, the audio processing unit 900 may amplify a positive polarity audio signal and a negative polarity audio signal to a positive polarity vibration driving voltage and a negative polarity vibration driving voltage, respectively, and output the same according to a certain gain value or a gain value controlled by the controller 820.

For example, the audio processing unit 900 may provide a first vibration driving voltage Vd1+ having positive polarity to the first electrode E1 of the first vibration element 510 and provide a second vibration driving voltage Vd2+ having positive polarity to the first electrode E1 of the second vibration element 520. Also, the audio processing unit 900 may provide a first vibration drive voltage Vd1− having negative polarity to the second electrode E2 of the first vibration element 510 and provide a second vibration driving voltage Vd2− having negative polarity to the second electrode E2 of the second vibration element 520.

Each of the first and second vibration elements 510 and 520 may include a piezoelectric material layer PM, a first electrode E1 disposed on a front surface of the piezoelectric material layer PM, and a second electrode E2 disposed on a rear surface of the piezoelectric material layer PM.

The piezoelectric material layer PM may include a piezoelectric material having an inverse piezoelectric effect according to an electric field and a piezoelectric effect according to compression. In an example, the piezoelectric material has the characteristics that vibration is generated due to an electric field based on the applied voltage and, conversely, an electrical signal is generated according to a potential difference of dielectric polarization based on a change in relative position of a positive (+) ion and a negative (−) ion as a pressure or torsion phenomenon acts on a crystal structure, e.g., from an external force.

According to an example, the piezoelectric material of the vibration elements 510 and 520 may include a polymer material, a thin film material, a composite material, single crystal ceramic, or polycrystalline ceramic.

For example, the piezoelectric material of the polymer material may be piezopolymer including at least one of polyvinylidene fluoride (PVDF) homopolymer, polyvinylidene fluoride (PDVF) copolymer, polyvinylidene fluoride (PVDF) terpolymer, cyano-polymer, cyano-copolymer, and boron nitride polymer, but is not limited thereto. The piezoelectric material of the thin film material may include ZnO, CdS, or AlN. The piezoelectric material of the composite material may include lead zirconate titanate (PZT)-PVDF, PZT-silicon rubber, PZT-epoxy, PZT-foamed polymer, or PZT-foamed urethane. The piezoelectric material of the single crystal ceramic may include $\alpha$-AlPO$_4$, $\alpha$-SiO$_2$, LiNbO$_3$, Tb$_2$(MoO$_4$)$_3$, Li$_2$B$_4$O$_7$, or ZnO. The piezoelectric material of the polycrystalline ceramic may include a PZT system, a PT system, a PZT-complex perovskite system, or BaTiO$_3$.

The first electrode E1 and the second electrode E2 may be provided to overlap each other with the piezoelectric material layer PM interposed therebetween. The first electrode E1 and the second electrode E2 may be formed of an opaque metal material having relatively low resistance and good heat dissipation properties. However, the first electrode E1 and the second electrode E2 are not limited thereto, and may be formed of a transparent conductive material or a conductive polymer material.

Figure 5:
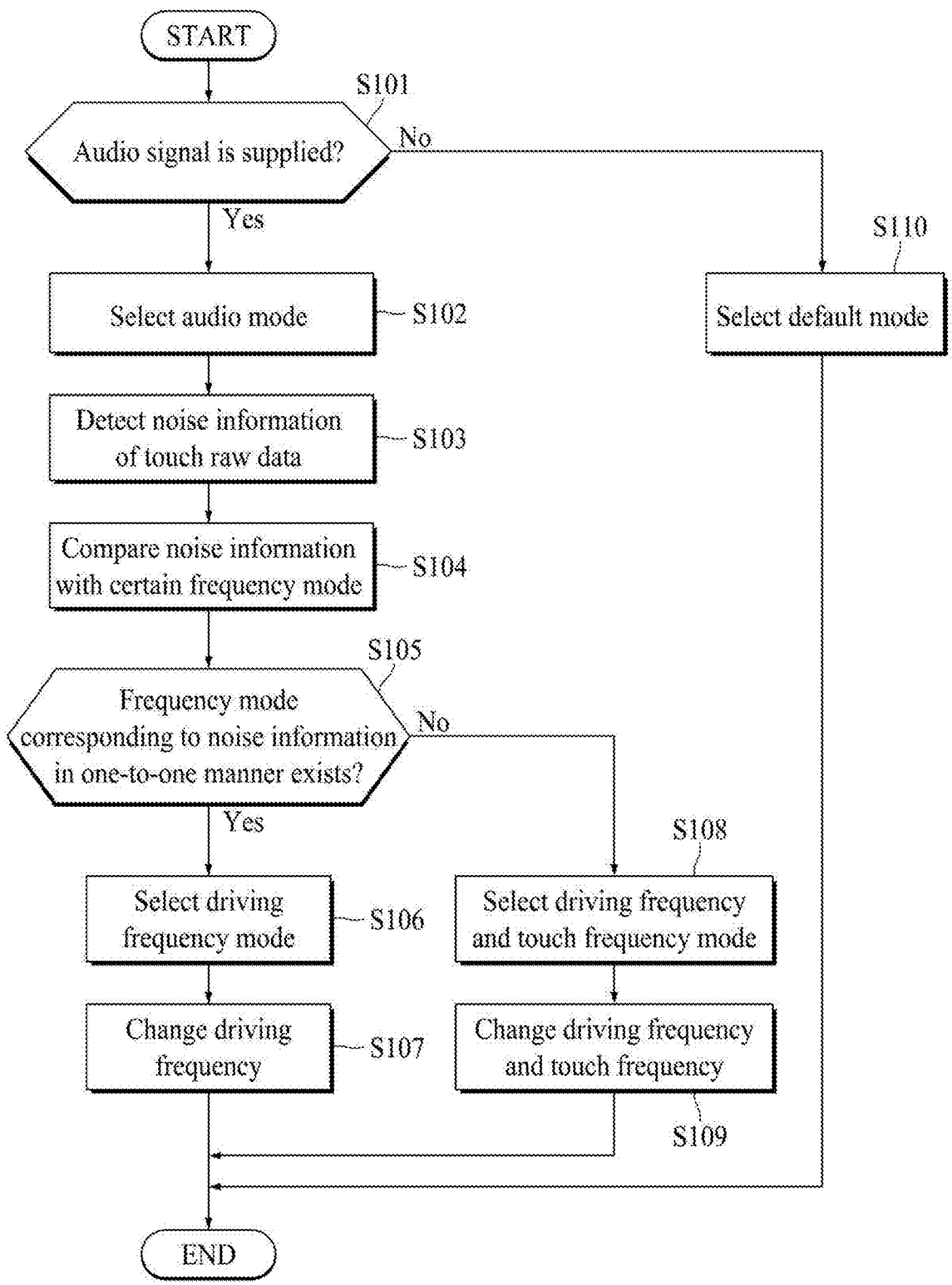
FIG. 5 is a flowchart illustrating a driving method of the electronic apparatus shown in FIG. 2.

FIG. 5 is a flowchart illustrating a method of driving the electronic apparatus shown in FIG. 2.

With reference to FIG. 5, the controller 820 may select an audio mode or a default mode depending on whether the vibration generating unit 500 is driven. That is, the controller 820 may select the audio mode or the default mode depending on whether the audio processing unit 900 supplies the audio signal AS to at least one vibration element 510 (S101).

The controller 820 may select the audio mode when the audio processing unit 900 supplies the audio signal AS to at least one vibration element 510 to drive the at least one vibration element 510 (S102).

The touch driver 430 may sense a user's touch in the audio mode, generate touch raw data, and compare the touch raw data with a certain reference pattern to detect noise information (S103). The touch driver 430 may generate touch data TD including touch coordinate information and noise information and provide the touch data TD to the controller 820.

The controller 820 may receive the touch data TD including noise information in the audio mode and compare the noise information with a plurality of predetermined frequency modes (S104). In an example, each of the plurality of frequency modes may correspond in a one-to-one manner to specific noise information, and when the audio processing unit 900 is driven in a frequency mode corresponding in a one-to-one manner to the specific noise information, a driving frequency of the audio signal AS may have an optimal frequency that may reduce the specific noise included in the touch raw data.

The controller 820 may compare the noise information with the plurality of predetermined frequency modes and select a driving frequency mode, a driving frequency, and touch frequency mode according to whether there is a frequency mode corresponding in a one-to-one manner to the noise information (S105). For example, when there is a frequency mode corresponding in a one-to-one manner to the noise information as a result of comparing the noise information with the plurality of predetermined frequency modes, the controller 820 may select the driving frequency mode (S106).

The controller 820 may provide a driving frequency control signal DFC to the audio processing unit 900 according to a selected frequency mode among the plurality of frequency modes in the driving frequency mode to change the driving frequency of the audio signal AS (S107). In this manner, the controller 820 may remove noise of the touch data TD by changing the driving frequency of the audio signal AS.

In another example, if there is no frequency mode corresponding in a one-to-one manner to the noise information as a result of comparing the noise information with the plurality of predetermined frequency modes, the controller 820 may select the driving frequency and touch frequency mode (S108).

The controller 820 may provide the driving frequency control signal DFC to the audio processing unit 900 in the driving frequency and touch frequency mode to change the driving frequency of the audio signal AS, and provide a touch frequency control signal TFC to the touch driver 430 to change a touch frequency of the touch driving signal Tx (S109). Accordingly, even if there is no frequency mode corresponding in a one-to-one manner to the noise information, the controller 820 may determine the driving frequency of the audio signal AS and the touch frequency of the touch driving signal Tx capable of removing noise of the touch data TD.

The controller 820 may select the default mode if the audio processing unit 900 does not supply the audio signal AS to at least one vibration element 510 so the vibration generating unit 500 is not driven (S110).

Figure 6:
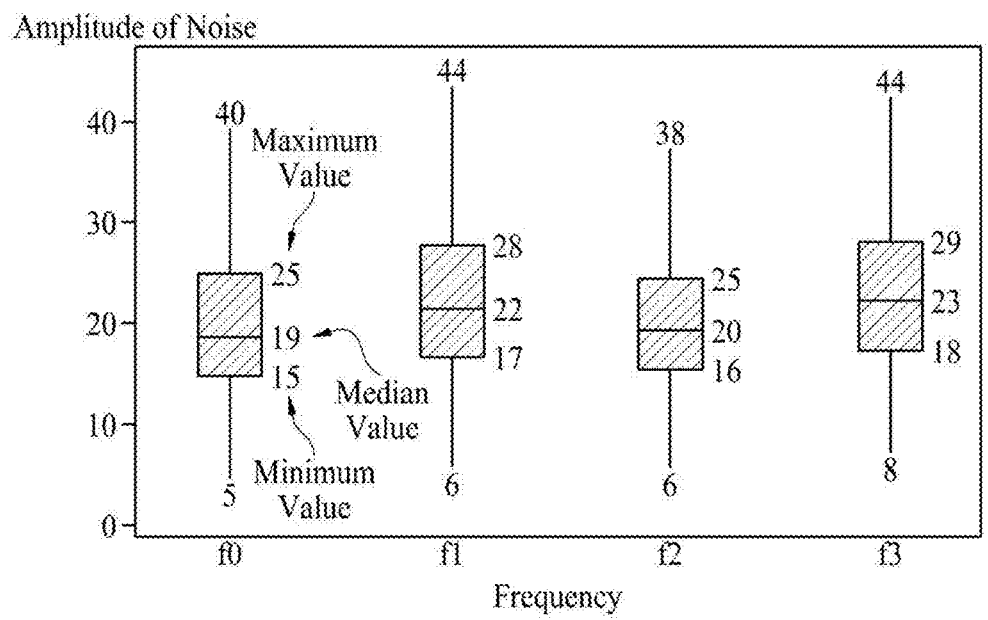
FIG. 6 is a graph showing amplitudes of noise of touch data according to driving frequencies of an audio signal in an electronic apparatus according to an example embodiment of the present disclosure.

FIG. 6 is a graph showing an amplitude of noise of touch data according to a driving frequency of an audio signal in an electronic apparatus according to an example embodiment of the present disclosure. For an example, the graph of FIG. 6 shows an amplitude of noise according to the audio signal AS having different driving frequencies, where the touch frequency of the touch driving signal Tx corresponds to 285 kHz.

With reference to FIG. 6, when at least one vibration element 510 is not driven or when the audio processing unit 900 does not provide the audio signal AS (f0), noise included in the touch raw data may have a maximum value of 25, a minimum value of 15, and a median value of 19. That is, even if at least one vibration element 510 is not driven, the touch raw data may include noise having a certain amplitude.

When the audio processing unit 900 provides an audio signal AS having 625 kHz to at least one vibration element 510 (f1), noise included in the touch raw data may have a maximum value of 28, a minimum value of 17, and a median value of 22. Accordingly, it can be seen that, when the audio processing unit 900 provides the audio signal AS having 625 kHz to the at least one vibration element 510 (f1), noise occurs in the touch raw data due to the audio signal AS having a high potential.

When the audio processing unit 900 provides an audio signal AS having 297 kHz to the at least one vibration element 510 (f2), noise included in the touch raw data may have a maximum value of 25, a minimum value of 16, and a median value of 20. Accordingly, it can be seen that, when the audio processing unit 900 provides the audio signal AS having 297 kHz to the at least one vibration element 510 (f2), noise of the touch raw data caused by the audio signal AS having a high potential is removed.

When the audio processing unit 900 provides an audio signal AS having 414 kHz to at least one vibration element 510, noise included in the touch raw data may have a maximum value of 29, a minimum value of 18, and a median value of 23. Accordingly, it can be seen that, when the audio processing unit 900 provides the audio signal AS having 414 kHz to the at least one vibration element 510 (f3), noise occurs in the touch raw data due to the audio signal AS having a high potential.

According to the example of FIG. 6, the audio processing unit 900 may provide an audio signal AS having a driving frequency of 625 kHz in the audio mode to the at least one vibration element 510, and the audio signal AS having a high potential may cause noise of the touch raw data. Accordingly, the controller 820 may receive the touch data TD including noise information and compare the noise information with a plurality of predetermined frequency modes. The controller 820 may determine that there is a frequency mode (for example, a driving frequency mode of 297 kHz) corresponding in a one-to-one manner to specific noise information, select a driving frequency mode, and output a driving frequency control signal DFC to the audio processing unit 900. That is, the controller 820 may change the driving frequency of the audio signal AS to 297 kHz by providing the driving frequency control signal DFC to the audio processing unit 900, and remove noise of the touch raw data caused by the audio signal AS.

As a result, in the electronic apparatus according to an example embodiment of the present disclosure, by changing only the driving frequency of the audio signal AS or changing both the driving frequency of the audio signal AS and the touch frequency of the touch driving signal Tx according to a result of comparing the noise information and the plurality of predetermined frequency modes, noise of the touch data TD caused by the audio signal AS having a high potential may be reduced or eliminated, thereby improving touch sensitivity and performance of the touch panel.

Figure 7:
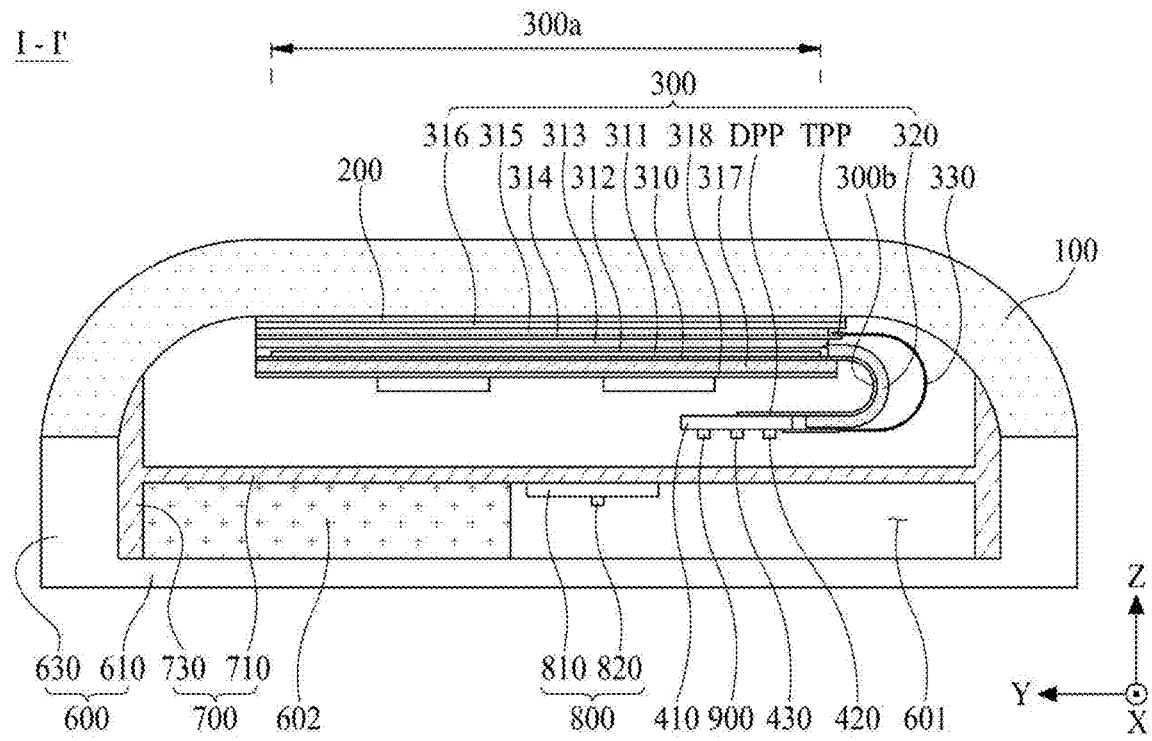
FIG. 7 shows another example of a cross-sectional view taken along line I-I' shown in FIG. 1.

FIG. 7 is another example of a cross-sectional view taken along line I-I' shown in FIG. 1. The electronic apparatus shown in FIG. 7 is different from the electronic apparatus shown in FIG. 2 in the arrangement of the audio processing unit 900. The same configurations as those described above for FIG. 2 will be briefly described or omitted.

With reference to FIG. 7, the circuit board 410 may be connected to the display module 300 and allow the display driving circuit 420, the touch driver 430, and the audio processing unit 900 to be mounted thereon. The circuit board 410 may be electrically connected to the display pad part DPP provided on the flexible substrate 310 by a film attaching process and may be disposed to be overlap the back plate 317 by bending the flexible substrate 310. According to an example, the circuit board 410 may provide image data and a timing synchronization signal supplied from the driving circuit unit 800 to the display driving circuit 420 and may provide a voltage required for driving each of the pixel array layer 311, the display driving circuit 420, the touch driver 430, and the audio processing unit 900.

The driving circuit unit 800 may be disposed on a rear surface of the display module 300 to generate image data and a timing synchronization signal for driving the display module 300 and control the vibration generating unit 500 on the basis of the touch data TD. According to an example, the driving circuit unit 800 may include a main board 810 and a controller 820.

The main board 810 may be disposed in the circuit receiving space 601 to support the controller 820. For example, the main board 810 may be disposed on one surface of the middle plate 710 facing the rear cover 610 and supported by the middle plate 710. The main board 810 may be electrically connected to the circuit board 410 and the vibration generating unit 500 and allow the controller 820 to be mounted thereon. For example, the main board 810 may provide the image data and the timing synchronization signal supplied from the controller 820 to the display driving circuit 420 mounted on the circuit board 410, and may provide a voltage required for driving each of the controller 820 and the vibration generating unit 500.

The controller 820, which controls an overall operation of the electronic apparatus, may be represented as a host controller, a microprocessor, an application processor, or the like. In an example, the controller 820 may display an image by providing the image data and the timing synchronization signal to the display driving circuit 420, and may calculate a touch position on the basis of the touch data TD provided from the touch driver 430 and execute an application corresponding to the calculated touch position.

The audio processing unit 900 may be mounted on the circuit board 410 to provide the audio signal AS to the at least one vibration element 510. In an example, the audio processing unit 900 amplifies the vibration signal VS provided from the controller 820 during the audio mode to generate the audio signal AS in the form of a pulse width modulation (PWM) signal and converts the audio signal AS into a vibration driving voltage in the form of a sine wave. For example, a load unit 910 may receive the audio signal AS in the form of a PWM signal output from the audio processing unit 900 and convert the received audio signal AS into a vibration driving voltage in the form of a sine wave.

For example, in a case where the audio processing unit 900 is mounted on the main board 810 to provide the audio signal AS to at least one vibration element 510 and the touch driver 430 is mounted on the circuit board 410 to sense a user's touch through the touch electrode layer 314, because the audio signal AS has a high potential for outputting sound, noise may occur. Therefore, in the electronic apparatus according to an example embodiment of the present disclosure, the audio processing unit 900 is mounted on the circuit board 410 together with the display driving circuit 420 and the touch driver 430, whereby the driving circuit unit 800 may not directly provide the audio signal having a high potential to the vibration generating unit 500 disposed on the rear surface of the display module 300. Accordingly, the driving circuit unit 800 of the electronic apparatus according to an example embodiment of the present disclosure may not provide a separate signal having a high potential to the circuit board 410 directly connected to the vibration generating unit 500 or the display module 300 disposed on the rear surface of the display module 300 having a high potential, and the audio processing unit 900 may be mounted on the circuit board 410 spaced apart from the driving circuit unit 800 to provide the audio signal having a high potential to the vibration generating unit 500, thereby preventing occurrence of noise in touch raw data generated by the touch driver 430. In addition, in the electronic apparatus according to an example embodiment of the present disclosure, the audio processing unit 900 may be mounted on the circuit board 410 together with the display driving circuit 420 and the touch driver 430, thereby improving compatibility between the driving circuits mounted on the circuit board 410.

As a result, in the electronic apparatus according to an example embodiment of the present disclosure, by controlling the driving frequency of the audio signal AS or the touch frequency of the touch driving signal Tx through the controller 820, noise included in the touch data TD may be reduced or eliminated. Further, in the electronic apparatus according to an example embodiment of the present disclosure, by mounting the audio processing unit 900 on the circuit board 410 together with the display driving circuit 420 and the touch driver 430, occurrence of noise in the touch raw data may be prevented.

In the electronic apparatus according to an example embodiment of the present disclosure, by changing a driving frequency of an audio signal provided to the vibration generating unit on the basis of noise information included in touch data, noise of the touch data may be reduced and performance of the touch panel may be improved.

In the electronic apparatus according to an example embodiment of the present disclosure, by mounting the audio processing unit providing an audio signal to the vibration generating unit together with the display driving circuit and the touch driver, compatibility between the driving circuits may be improved.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. An electronic apparatus, comprising:
   a display module configured to display an image, the display module including a touch electrode layer;
   a vibration generator including a vibration element on a rear surface of the display module;
   a touch driver configured to generate touch data by sensing a touch through the touch electrode layer, the touch data including noise information;
   an audio processor configured to supply an audio signal to the vibration element; and
   a controller configured to change a driving frequency of the audio signal, based on the noise information of the touch data,
   wherein the noise information is detected by:
   sensing a user's touch to generate touch raw data, and comparing the touch raw data with a predetermined reference pattern.

2. The electronic apparatus of claim 1, wherein the controller is further configured to:
   select an audio mode when the audio processor supplies the audio signal to the vibration element; and
   select a default mode when the audio processor does not supply the audio signal to the vibration element.

3. The electronic apparatus of claim 2, wherein the touch driver is further configured to:
   sense the touch in the audio mode to generate touch raw data; and
   compare the touch raw data with the predetermined reference pattern to detect the noise information.

4. The electronic apparatus of claim 2, wherein the controller is further configured to:
   receive the touch data including the noise information in the audio mode; and
   compare the noise information with a plurality of predetermined frequency modes.

5. The electronic apparatus of claim 4, wherein the controller is further configured to change the driving frequency of the audio signal by selecting the driving frequency mode when a frequency mode corresponding to the noise information in a one-to-one manner exists.

6. The electronic apparatus of claim 4, wherein the touch driver is further configured to sense the touch by providing a touch driving signal to the touch electrode layer.

7. The electronic apparatus of claim 6, wherein, when the frequency mode corresponding to the noise information in a one-to-one manner does not exist, the controller is further configured to:
   select a driving frequency and a touch frequency mode; and
   change the driving frequency of the audio signal and the touch frequency of the touch driving signal.

8. An electronic apparatus, comprising:
   a display module configured to display an image, the display module including a touch electrode layer;

a vibration generator including a vibration element on a rear surface of the display module;

a touch driver configured to generate touch data by sensing a touch through the touch electrode layer, the touch data including noise information; and a driving circuit on a rear surface of the display module, the driving circuit being configured to:
  generate image data and a timing synchronization signal for driving the display module; and
  control the vibration generator based on the touch data, wherein the driving circuit includes a controller configured to change a driving frequency of an audio signal provided to the vibration generator based on the noise information of the touch data, wherein the noise information is detected by:
  sensing a user's touch to generate touch raw data, and
  comparing the touch raw data with a predetermined reference pattern.

9. The electronic apparatus of claim 8, further comprising:
a display driving circuit configured to:
  receive the image data and the timing synchronization signal; and
  provide a data signal and a scan signal to the display module; and
a circuit board connected to the display module, wherein the display driving circuit and the touch driver are mounted on the circuit board.

10. The electronic apparatus of claim 9, wherein the driving circuit further includes an audio processor configured to provide the audio signal to the vibration element.

11. The electronic apparatus of claim 9, further comprising an audio processor mounted on the circuit board, the audio processor being configured to provide the audio signal to the vibration element.

12. The electronic apparatus of claim 9, further comprising:
a rear cover configured to cover a rear surface of the display module, with the circuit board therebetween; and
a circuit receiving space between the circuit board and the rear surface, the circuit receiving space being configured to receive the driving circuit and a battery.

13. The electronic apparatus of claim 8, wherein:
the touch driver is further configured to provide a touch driving signal to the touch electrode layer to sense the user touch; and
the controller is further configured to additionally change a touch frequency of the touch driving signal based on the touch data.

* * * * *